(12) United States Patent
Yanagisawa et al.

(10) Patent No.: US 8,348,433 B2
(45) Date of Patent: Jan. 8, 2013

(54) LIQUID-COOLING DEVICE INCLUDING LIQUID PUMPING UNIT AND LIQUID STORAGE UNIT AND PROJECTOR INCLUDING LIQUID-COOLING DEVICE

(75) Inventors: Yoshiyuki Yanagisawa, Matsumoto (JP); Yasunaga Momose, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 329 days.

(21) Appl. No.: 12/730,430

(22) Filed: Mar. 24, 2010

(65) Prior Publication Data

US 2010/0245779 A1 Sep. 30, 2010

(30) Foreign Application Priority Data

Mar. 25, 2009 (JP) ................................. 2009-074216

(51) Int. Cl.
| | |
|---|---|
| G03B 21/16 | (2006.01) |
| F21V 29/00 | (2006.01) |
| F28D 1/02 | (2006.01) |
| F28D 1/04 | (2006.01) |
| F28F 9/02 | (2006.01) |
| H05K 7/20 | (2006.01) |

(52) U.S. Cl. ............ 353/54; 353/52; 362/294; 165/153; 165/174; 165/113; 165/151; 361/699

(58) Field of Classification Search ............ 353/54, 353/52; 362/294; 165/153, 173, 174, 113, 165/151; 361/699
See application file for complete search history.

(56) References Cited

U.S. PATENT DOCUMENTS

| | | | | |
|---|---|---|---|---|
| 7,150,543 | B2* | 12/2006 | Fujimori et al. | 362/373 |
| 7,172,291 | B2 | 2/2007 | Kitabayashi | |
| 7,384,152 | B2 | 6/2008 | Takeuchi | |
| 2002/0191159 | A1* | 12/2002 | Nagao et al. | 353/54 |
| 2005/0117077 | A1* | 6/2005 | Utsunomiya | 349/5 |
| 2005/0185244 | A1* | 8/2005 | Fujimori et al. | 359/237 |
| 2006/0209266 | A1* | 9/2006 | Utsunomiya | 353/54 |
| 2007/0068653 | A1 | 3/2007 | Kondou et al. | |

FOREIGN PATENT DOCUMENTS

| | | |
|---|---|---|
| JP | 2005-121890 A | 5/2005 |
| JP | 2005-292669 A | 10/2005 |
| JP | 2005-331928 A | 12/2005 |
| JP | 2006-119493 A | 5/2006 |
| JP | 2007-041412 A | 2/2007 |
| JP | 2007-264590 A | 10/2007 |
| JP | 2009-031557 A | 2/2009 |

* cited by examiner

*Primary Examiner* — Georgia Y Epps
*Assistant Examiner* — Magda Cruz
(74) *Attorney, Agent, or Firm* — AdvantEdge Law Group, LLC

(57) ABSTRACT

A projector includes a liquid-cooling device configured to cool down an optical element, an optical element holding member that is constructed to allow cooling liquid to flow in and out and holds the optical element; a liquid pumping unit that circulate cooling liquid; a liquid storage unit that is constructed to allow cooling liquid to flow in and out and temporarily stores cooling liquid therein; and a plurality of liquid circulation members that connect the optical element holding member, the liquid pumping unit, and the liquid storage unit and define a flow channel of the cooling liquid, and the liquid pumping unit, the liquid storage unit, and the optical element holding member are arranged along a circulation direction of the cooling liquid along the flow path in order of the liquid pumping unit, the liquid storage unit, and the optical element holding member.

13 Claims, 5 Drawing Sheets

LIQUID-COOLING DEVICE INCLUDING LIQUID PUMPING UNIT AND LIQUID STORAGE UNIT AND PROJECTOR INCLUDING LIQUID-COOLING DEVICE

BACKGROUND

1. Technical Field

The present invention relates to a projector.

2. Related Art

In the related art, a projector is provided with a construction for cooling down an optical element using cooling liquid, in order to cool down effectively the optical element such as a liquid crystal panel (refer to JP-A-2007-41412).

The projector disclosed in JP-A-2007-41412 includes an optical element holding member that is constructed to allow cooling liquid to flow in and out and holds an optical element, a liquid pumping unit which forcibly circulates the cooling liquid, and a plurality of liquid circulation members which connect the respective units and form a ring-shaped flow path to circulate the cooling liquid. The optical element is cooled down by exchanging heat with the cooling liquid circulating along the ring-shaped flow path through the optical element holding member.

However, since the liquid pumping unit is constructed as a so-called pump, the cooling liquid is intermittently pumped from the liquid pumping unit at a predetermined frequency. That is, pulsation occurs in the cooling liquid pumped from the liquid pumping unit.

In the projector disclosed in JP-A-2007-41412, the cooling liquid pumped from the liquid pumping unit directly flows into the optical element holding member through the liquid circulation members. In other words, the pulsating cooling liquid directly flows into the optical element holding member.

When the pulsating cooling liquid flows into the optical element holding member, the pulsation of the cooling liquid spreads to the optical element holding member or the optical element. Therefore, it is difficult to secure stably the image quality of a projected image.

SUMMARY

An advantage of some aspects of the invention is that it provides a projector capable of stably securing the image quality of a projected image, while effectively cooling optical elements using cooling liquid.

According to an aspect of the invention, there is provided a projector includes a liquid-cooling device configured to cool down an optical element using cooling liquid. An optical element holding member that is constructed to allow cooling liquid to flow in and out and holds the optical element so as to transfer heat to the cooling liquid; a liquid pumping unit configured to circulate cooling liquid; a liquid storage unit that is constructed to allow cooling liquid to flow in and out and temporarily stores cooling liquid therein; and a plurality of liquid circulation members configured to connect the optical element holding member, the liquid pumping unit, and the liquid storage unit and define a flow channel of the cooling liquid, and the liquid pumping unit, the liquid storage unit, and the optical element holding member are arranged along a circulation direction of the cooling liquid along the flow path in order of the liquid pumping unit, the liquid storage unit, and the optical element holding member.

The liquid-cooling device includes the liquid storage unit that temporarily stores cooling liquid therein, in addition to the optical element holding member and the liquid pumping unit. Furthermore, the liquid pumping unit, the liquid storage unit, and the optical element holding member are arranged along the circulation direction of cooling liquid in order of the liquid pumping unit, the liquid storage unit, and the optical element holding member. Accordingly, the cooling liquid which is pumped from the liquid pumping unit to pulsate is temporarily stored in the liquid storage unit. That is, the liquid storage unit functions as a buffer to absorb the pulsation of the cooling liquid. Therefore, the cooling liquid flows into the optical element holding member without pulsating.

Therefore, since the pulsation of the cooling liquid does not spread to the optical element holding member and the optical element, it is possible to secure stably the image quality of a projected image.

In the projector according to the aspect of the invention, the liquid pumping unit and the liquid storage unit may be directly connected together through the liquid circulation member.

Meanwhile, another member such as a heat exchange section which will be described below is adopted in the liquid-cooling device, in addition to the optical element holding member, the liquid pumping unit, and the liquid storage unit. Furthermore, the other member is disposed between the liquid pumping unit and the liquid storage unit. In this case, since the pulsation of cooling liquid generated by the liquid pumping unit spreads to the other member, it is difficult to maintain favorably the function of the other member.

In the aspect of the invention, since the liquid pumping unit and the liquid storage unit are directly connected together through the liquid circulation member, it is possible to prevent the pulsation of the cooling liquid generated by the liquid pumping unit at an early stage. That is, even when the other member is adopted as the liquid-cooling device as described above, it is possible to prevent the pulsation of the cooling liquid from spreading into the other member as well as the optical element and the optical element holding member. Therefore, it is possible to maintain favorably the function of the other member.

In the projector according to the aspect of the invention, the liquid-cooling device may further include: a heat exchange section that is constructed to allow cooling liquid to flow in and out and exchanges heat with cooling liquid; and a thermoelectric conversion element that has a heat suction surface and a heat dissipation surface, the heat suction surface being connected to the heat exchange section so as to transfer heat. The liquid storage unit, the heat exchange section, and the optical element holding member may be arranged along the circulation direction in order of the liquid storage unit, the heat exchange section, and the optical element holding member.

Since the liquid-cooling device includes the heat exchange section and the thermoelectric conversion element, the thermoelectric conversion element is driven to cool down the heat exchange section. Furthermore, it is possible to cool down cooling liquid flowing into and from the heat exchange section. Therefore, since the cooling liquid with a low temperature is circulated through the optical element holding member, it is possible to cool down effectively the optical element.

In consideration of the characteristics of the thermoelectric conversion element, when the temperature of cooling liquid (heat exchange section) which is cooled down by the heat suction surface is high, it is difficult to reduce effectively the temperature of the cooling liquid to the atmosphere temperature or less, for example.

In the projector according to the aspect of the invention, the liquid storage unit, the heat exchange section, and the optical element holding member are arranged along the circulation direction of cooling liquid in order of the liquid storage unit, the heat exchange section, and the optical element holding member. Accordingly, the cooling liquid which is heated when circulating through the optical element holding member is temporarily stored in the liquid storage unit, and then cooled down by the thermoelectric conversion element. That is, as the cooling liquid is temporarily stored in the liquid storage unit, the heat of the cooling liquid is diffused inside the liquid storage unit such that the temperature of the cooling liquid decreases. Furthermore, as the cooling liquid of which the temperature is reduced by the liquid storage unit is cooled down by the thermoelectric conversion element, it is possible to reduce effectively the temperature of the cooling liquid to the atmosphere temperature or less, for example. Therefore, as the cooling liquid of which the temperature is effectively reduced is circulated through the optical element holding member, it is possible to cool down the optical element more effectively.

In the projector according to the aspect of the invention, the heat exchange section and the optical element holding member may be directly connected together through the liquid circulation member.

Since the heat exchange section and the optical element holding member are directly connected together through the liquid circulation member, the cooling liquid of which the temperature is effectively reduced by the thermoelectric conversion element may directly flow into the optical element holding member. That is, since the cooling liquid flows into the optical element holding member in a state in which the temperature thereof is reduced by the thermoelectric conversion element, it is possible to cool down the optical element more effectively.

In the projector according to the aspect of the invention, the optical element holding member and the liquid pumping unit may be directly connected together through the liquid circulation member.

Meanwhile, the liquid pumping unit may easily generate heat when being driven. That is, when cooling liquid circulates the liquid pumping unit, the temperature thereof may be increased by the liquid pumping unit.

In the aspect of the invention, the optical element holding member and the liquid pumping unit are directly connected together through the liquid circulation member. Therefore, when seen along the circulation direction of the cooling liquid, the optical element holding member is disposed at the most distant position from the liquid pumping unit. Therefore, since the cooling liquid does not flow into the optical element holding member in a state in which the temperature thereof is increased by the liquid pumping unit, the cooling efficiency of the optical element does not decrease.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the drawings.

Construction of Projector

Figure 1:
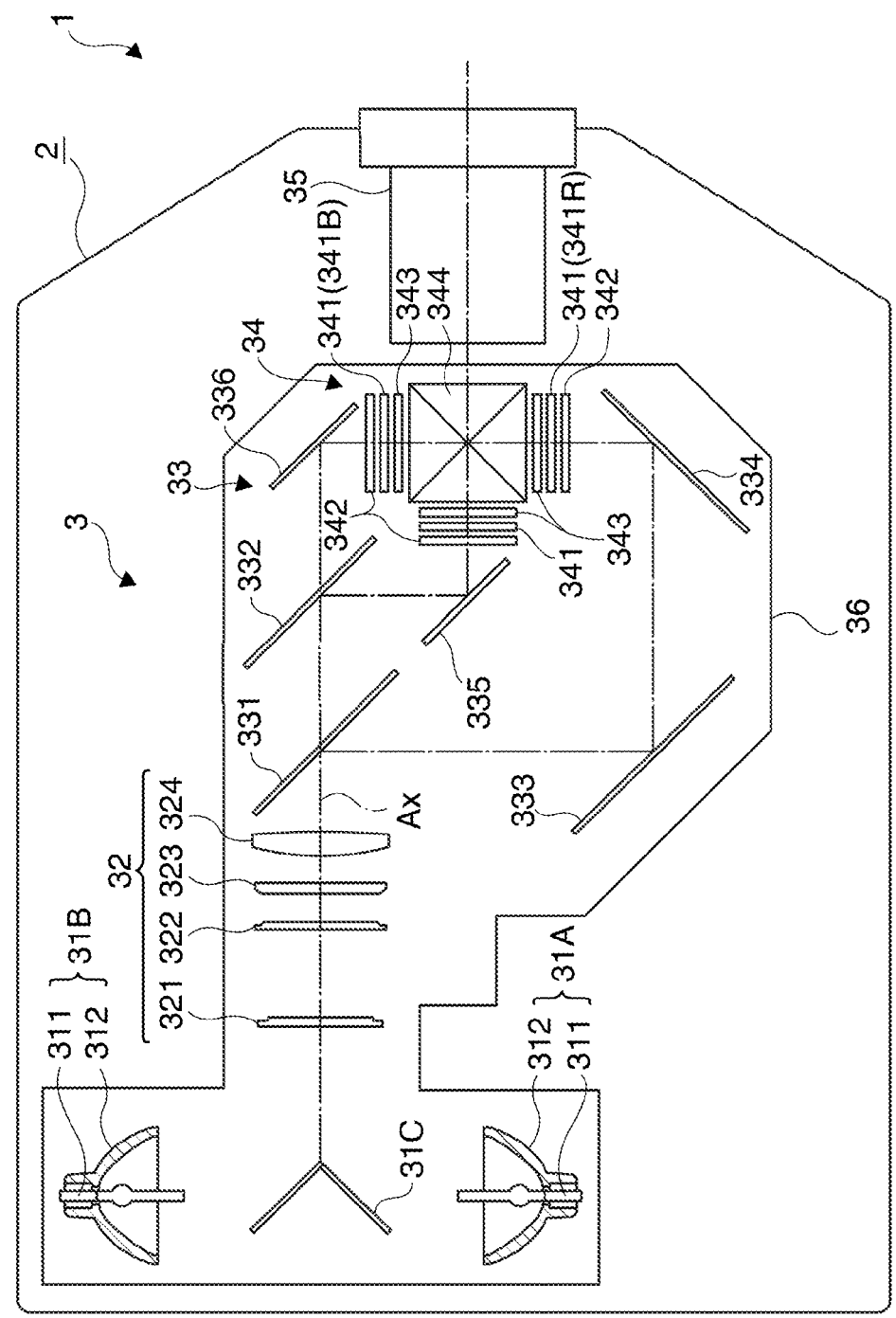
FIG. 1 is a diagram illustrating the schematic construction of a projector according to an embodiment of the invention.

FIG. 1 is a diagram illustrating the schematic construction of a projector 1 according to an embodiment of the invention.

The projector 1 forms an image in accordance with image information and projects the formed image onto a screen (not shown) such that the projected image is displayed on the screen. Referring to FIG. 1, the projector 1 includes an optical unit 3 and a liquid-cooling device 4 (refer to FIG. 2) housed inside an exterior chassis 2.

Construction of Optical Unit

The optical unit 3 forms and projects an image in accordance with image information, under the control of a control device (not shown).

Referring to FIG. 1, the optical unit 3 includes a pair of light source devices 31A and 31B, a reflecting mirror 31C, an illumination optical device 32 having lens arrays 321 and 322, a polarization conversion element 323, and a superimposed lens 324, a color separation optical device 33 having dichroic mirrors 331 and 332 and reflecting mirrors 333 to 336, an optical device 34 having three liquid crystal panels 341 (a red-light-side liquid crystal panel 341R, a green-light-side liquid crystal panel 341G, and a blue-light-side liquid crystal panel 341B) serving as light modulation elements, three incident-side polarization plates 342, and three emission-side polarization plates 343, a cross dichroic prism 344 serving as a color composition optical device, a projection lens 35 serving as a projection optical device, and an optical part chassis 36 housing the respective members 31A, 31B, and 32 to 34 therein.

As illustrated in FIG. 1, the pair of light source devices 31A and 31B have the same construction and include a light source lamp 311 and a reflector 312. The pair of light source devices 31A and 31B are disposed to face each other and interpose the reflecting mirror 31C such that light fluxes are emitted toward the reflecting mirror 31C.

In the optical unit 3, by the above-described construction, the light fluxes emitted from the pair of light source devices 31A and 31B are reflected along an illumination optical axis Ax (FIG. 1) set inside the optical part chassis 36 by the reflecting mirror 31C, and then irradiated onto the illumination optical device 32. The light fluxes irradiated onto the illumination optical device 32 are separated into three color (R, G, and B) lights by the color separation optical device 33, while the in-plane illumination of the light fluxes is uniformized by the illumination optical device 32. The respective light crystal panels 341 modulate the separated color lights in accordance with image information so as to form images corresponding to the respective color lights. The images corresponding to the respective color lights are composed by the prism 344 and then projected onto a screen (not shown) by the projection lens 35.

Construction of Liquid-cooling Device

Figure 2:
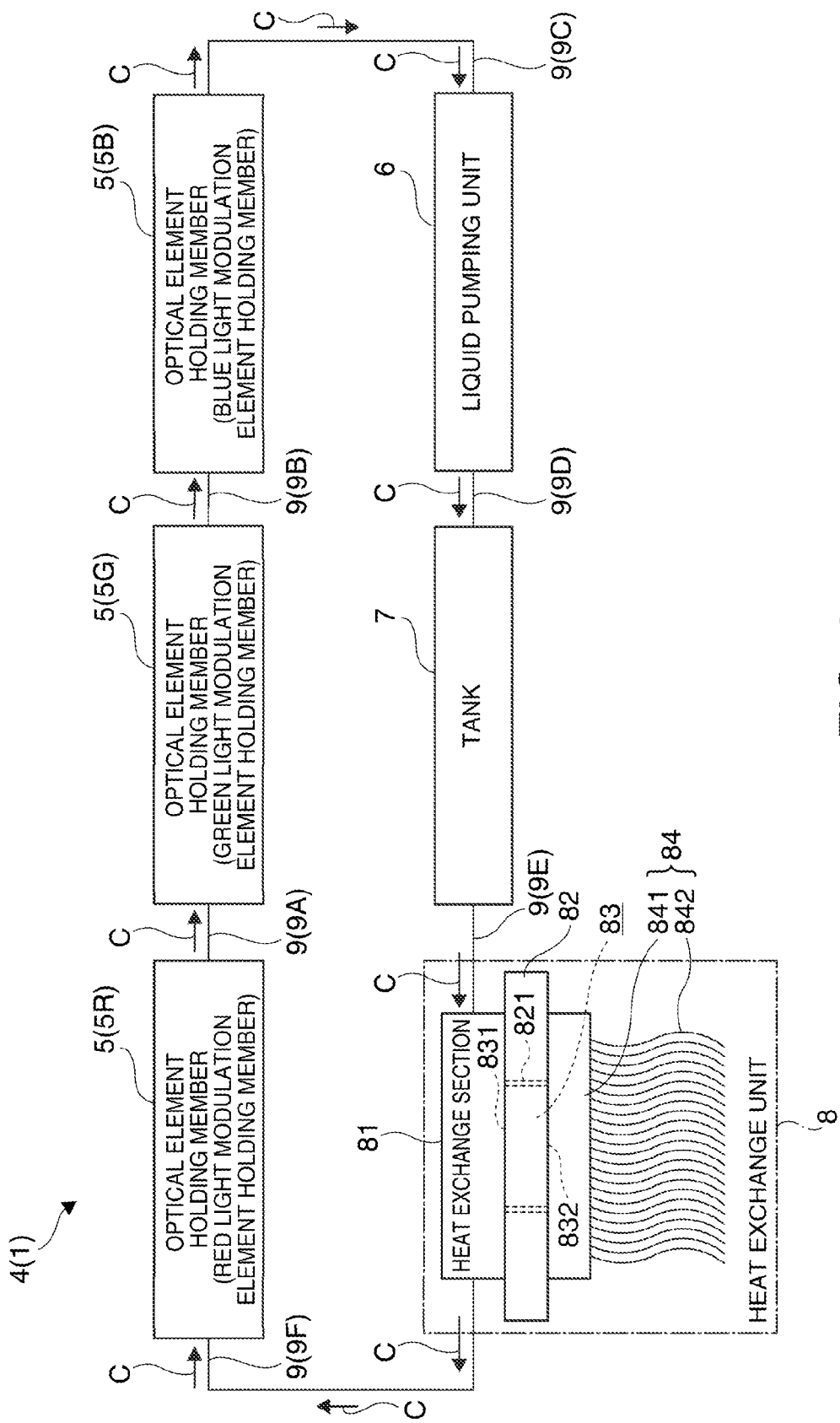
FIG. 2 is a diagram schematically illustrating the construction of a liquid-cooling device according to the embodiment of the invention.

FIG. 2 is a diagram schematically illustrating the construction of the liquid-cooling device 4.

The liquid-cooling device 4 circulates cooling liquid such as water or ethylene glycol along a ring-shaped flow path and cools down the liquid crystal panels 341 serving as optical elements by using the cooling liquid. Referring to FIG. 2, the liquid-cooling device 4 includes three optical element holding members 5, a liquid pumping unit 6, a tank 7 serving as a liquid storage unit, a heat exchange unit 8, and a plurality of liquid circulation members 9.

The plurality of liquid circulation members 9 are constructed as pipe-shaped members capable of circulating cooling liquid therein and connect the respective units 5 to 8 to form a ring-shaped flow path.

The connection structure of the respective units 5 to 8 by the liquid circulation members 9 will be described later.

Construction of Optical Element Holding Member

Figure 3:
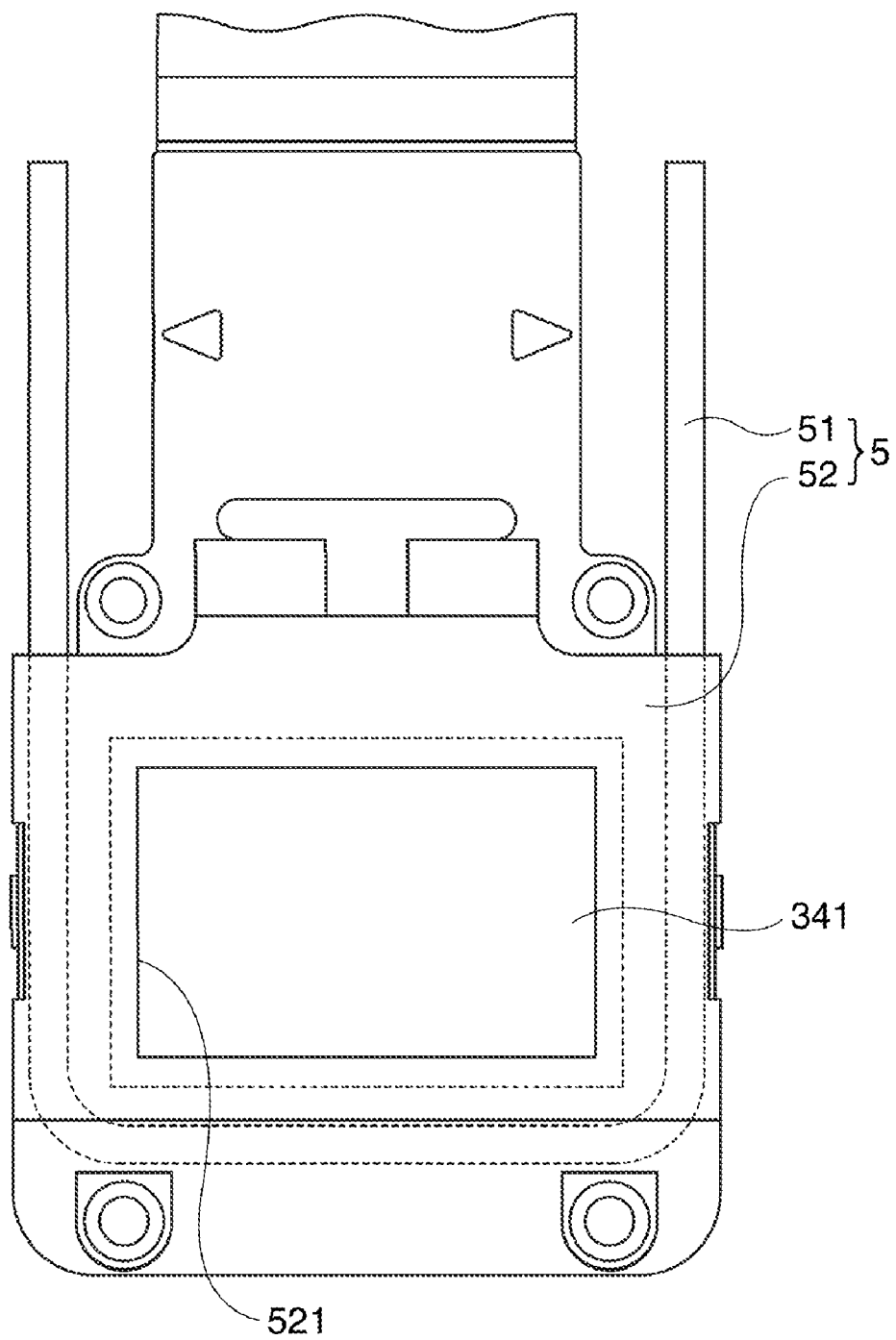
FIG. 3 is a diagram illustrating the structure of an optical element holding member according to the embodiment of the invention.

FIG. 3 is a diagram illustrating the structure of an optical element holding member 5. Specifically, FIG. 3 is a plan view in which the optical element holding member 5 is seen from a light flux incident side.

The three optical element holding members 5 hold the three liquid crystal panels 341, respectively, and cooling liquid flows into and from the optical element holding members 5 to cool down the three liquid crystal panels 341. Since the respective optical element holding members 5 have the same construction, the following descriptions will be focused on only one of the optical element holding members 5. Referring to FIG. 3, the optical element holding member 5 includes a liquid circulation pipe 51 and an optical element support frame 52.

The liquid circulation pipe 51 is bent to surround an image formation region (light transmission region) of the liquid crystal panel 341 in a plan view, and both ends of the liquid circulation pipe 51, through which cooling liquid flows in and out, extend upward in parallel to each other.

The optical element support frame 52 has a concave portion which is recessed toward the light-flux incident side so as to correspond to the exterior shape of the liquid crystal panel 341 in the light-flux emission side, although the concave portion is not illustrated specifically. The optical element support frame 52 houses and holds the liquid crystal panel 341 in the concave portion.

As illustrated in FIG. 3, the concave portion includes an opening portion 521 formed in the bottom thereof, the opening portion 521 corresponding to the image formation region of the liquid crystal panel 341.

The optical element support frame 52 includes a through-hole which is formed through the optical element support frame 52 so as to surround the concave portion and is U-shaped in a plan view, although the through-hole is not illustrated specifically. The liquid circulation pipe 51 is disposed in the through-hole.

Although not illustrated specifically, the optical element support frame 52 is divided into two frames, that is, a light-flux incident-side frame and a light-flux emission-side frame, and the liquid circulation pipe 51 is interposed by the two frames.

As described above, the optical element holding member 5 is disposed in such a manner that the liquid circulation pipe 51 faces the side end portion of the liquid crystal panel 341, and the heat of the liquid crystal panel 341 dissipates along a heat transmission path connecting the liquid crystal panel 341, the optical element support frame 52, and the liquid circulation pipe 51.

Construction of Liquid Pumping Unit

The liquid pumping unit 6 is a pump which circulates cooling liquid and circulates the cooling liquid along a ring-shaped flow path.

The liquid pumping unit 6 has an impeller disposed in a hollow member thereof. The liquid pumping unit 6 rotates the impeller to suck and pump the cooling liquid.

The liquid pumping unit 6 is not limited to the above-described construction in which the impeller is provided, but another construction using a diaphragm may be adopted.

Construction of Tank

Figure 4:
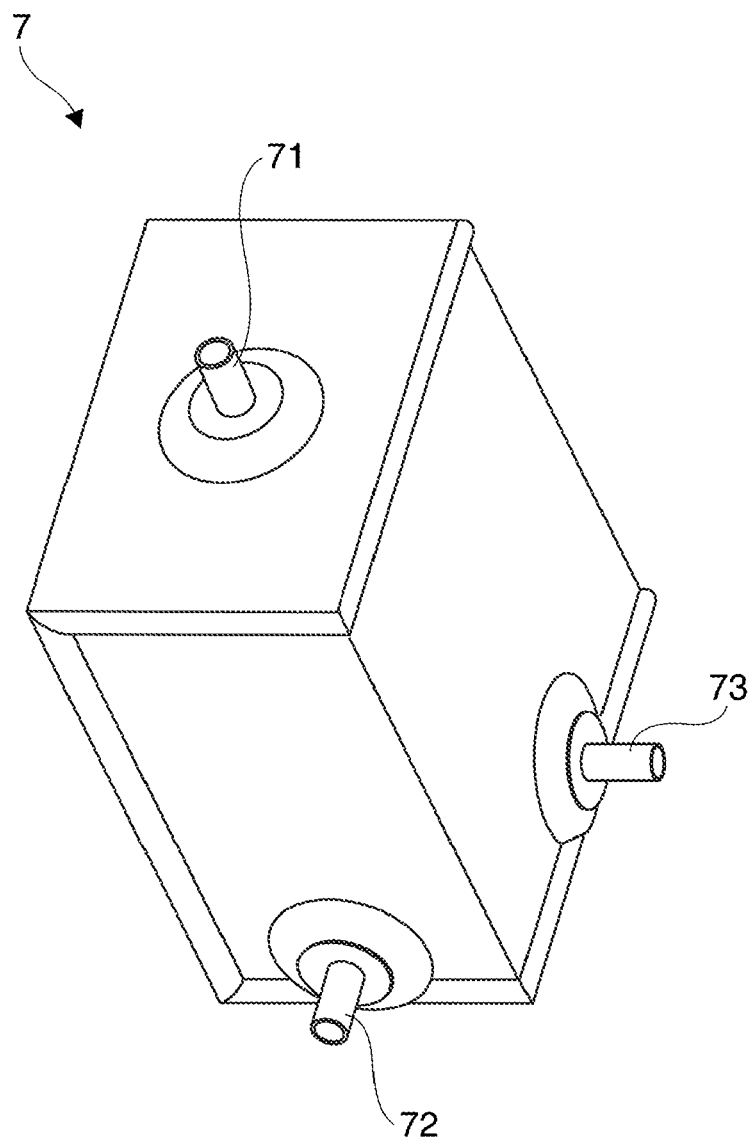
FIG. 4 is a perspective view illustrating the construction of a tank according to the embodiment of the invention.

FIG. 4 is a perspective view illustrating the construction of the tank 7.

The tank 7, which is formed of a hollow member having a rectangular parallelepiped shape, temporarily stores cooling liquid which has flown in and then discharges the stored cooling liquid.

Referring to FIG. 4, the tank 7 includes an injection portion 71 provided on an upper end surface thereof. The injection portion 71 communicates with the inside of the tank 7, and the cooling liquid is injected through the injection portion 71.

That is, as cooling liquid is injected through the injection portion 71 after the liquid-cooling device 4 is assembled, the liquid-cooling device 4 is filled with the cooling liquid.

Furthermore, the tank 7 includes an inlet portion 72 and an outlet portion 73 formed on two side surfaces thereof, as illustrated in FIG. 4. The inlet and outlet portions 72 and 73 communicate with the inside of the tank 7, and the cooling liquid flows into and from the tank 7 through the inlet and outlet portions 72 and 73.

The above-described tank 7 is formed of a metallic material such as aluminum.

Construction of Heat Exchange Unit

The heat exchange unit 8 reduces the temperature of cooling liquid circulating along the ring-shaped flow path. Referring to FIG. 2, the heat exchange unit 8 includes a heat exchange section 81, a compartment plate 82, a Peltier element 83 serving as a thermoelectric conversion element, and a heat-dissipation-side heat transmission member 84.

Figure 5:
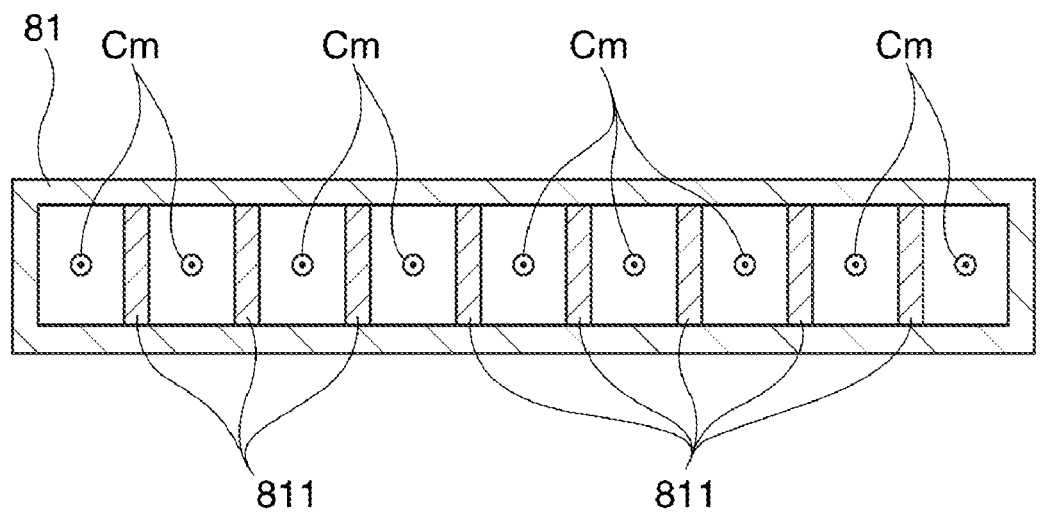
FIG. 5 is a cross-sectional view schematically illustrating the internal structure of a heat exchange section according to the embodiment of the invention.

FIG. 5 is a cross-sectional view schematically illustrating the internal structure of the heat exchange section 81. Specifically, FIG. 5 illustrates the cross-section of the heat exchange section 81 taken along a plane crossing the flow path at right angles.

The heat exchange section 81 is constructed as a hollow member having a rectangular parallelepiped shape, and exchanges heat with cooling liquid circulating therein.

Referring to FIG. 5, the heat exchange section 81 includes a plurality of plate bodies 811 which extend along the circulation direction of the cooling liquid and are arranged in parallel to each other in a direction crossing the circulation direction at right angles. Specifically, these plate bodies 811 have a thickness of several ten μm to several hundred μm, for example, and are arranged with an interval of several ten μm to several hundred μm provided therebetween.

In accordance with the above-described construction, a plurality of minute channels Cm (FIG. 5) through which cooling liquid circulates among the respective plate bodies 811 are formed inside the heat exchange section 81. That is, the heat exchange section 81 is constructed as a heat exchanger such as a so-called micro channel.

The compartment plate 82, which is formed of a plate body having a rectangular shape in a plan view, compartmentalizes the heat exchange section 81 and the heat-dissipation-side heat transmission member 84 while integrating the heat exchange section 81, the Peltier element 83, and the heat-dissipation-side heat transmission member 84. The compartment plate 82 is formed of a material having a low thermal conductivity (for example, 0.9 W/(m·K) or less).

Referring to FIG. 2, the compartment plate 82 has a rectangular shape smaller than the plan shape of the heat exchange section 81 and includes an opening portion 821 into which the Peltier element 83 is fitted.

The heat exchange section 81 is fixed to the peripheral portion of the opening portion 821 on one plate surface of the compartment plate 82 so as to block the opening portion 821.

The Peltier element 83 includes a plurality of junction pairs of which each is constructed by joining a p-type semiconductor and an n-type semiconductor through a metal piece, although the junction pairs are not illustrated specifically. The plurality of junction pairs are electrically and directly connected to each other.

When electric power is supplied to the Peltier element 83 constructed in such a manner, one end surface of the Peltier element 83 becomes a heat suction surface 831 which sucks heat, and the other end surface thereof becomes a heat dissipation surface 832 which dissipates heat, as illustrated in FIG. 2.

The Peltier element 83 is fitted into the opening portion 821 of the compartment plate 82, and the heat suction surface 831 is connected to the heat exchange section 81 so as to transfer heat.

Referring to FIG. 2, the heat-dissipation-side heat transmission member 84 includes a rectangular plate body 841 and a plurality of fin members 842 protruding from the plate body 841. That is, the heat-dissipation-side heat transmission member 84 is constructed as a so-called heat sink. The heat-dissipation-side heat transmission member 84 is fixed to the peripheral portion of the opening portion 821 on the other plate surface of the compartment plate 82 so as to block the opening portion 821. In this state, the heat-dissipation-side heat transmission member 84 is connected to the heat-dissipation surface 832 of the Peltier element 83 to transfer heat.

That is, the heat transmission path connecting the heat exchange section 81, the Peltier element 83, and the heat-dissipation-side heat transmission member 84 is formed in such a state that the respective members 81, 83, and 84 are integrated by the compartment plate 82.

Therefore, as the Peltier element 83 is driven, the heat suction surface 831 sucks heat to cool down the heat exchange section 81. Furthermore, the heat generated from the heat-dissipation surface 832 of the Peltier element 83 is dissipated to the outside through the heat-dissipation-side heat transmission member 84.

Connection Structure by Liquid Circulation Member

Next, the connection structure of the respective units 5 to 8 by the liquid circulation member 9 will be described.

For convenience of description, among the three optical element holding members 5, the optical element holding member which holds the red-light-side liquid crystal panel 341R is set to a red light modulation element holding member 5R, the optical element holding member which holds the green-light-side liquid crystal panel 341G is set to a green light modulation element holding member 5G, and the optical element holding member which holds the blue-light-side liquid crystal panel 341B is set to a blue light modulation element holding member 5B, as illustrated in FIG. 2.

Referring to FIG. 2, the liquid circulation member 9 includes six first to sixth liquid circulation members 9A to 9F.

Specifically, the first liquid circulation member 9A has an inflow side connected to one end of the liquid circulation pipe 51 in the red light modulation element holding member 5R and an outflow side connected to one end of the liquid circulation pipe 51 in the green light modulation element holding member 5G.

The second liquid circulation member 9B has an inflow side connected to the other end of the liquid circulation pipe 51 in the green light modulation element holding member 5G and an outflow side connected to one end of the liquid circulation pipe 51 in the blue light modulation element holding member 5B.

The third liquid circulation member 9C has an inflow side connected to the other end of the liquid circulation pipe 51 in the blue light modulation element holding member 5B and an outflow side connected to the liquid pumping unit 6.

The fourth liquid circulation member 9D has an inflow side connected to the liquid pumping unit 6 and an outflow side connected to the inlet portion 72 in the tank 7.

The fifth liquid circulation member 9E has an inflow side connected to the outlet portion 73 in the tank 7 and an outflow side connected to the heat exchange section 81, respectively.

The sixth circulation member 9F has an inflow side connected to the heat exchange section 81 and an outflow side connected to the other end of the liquid circulation pipe 51 in the red light modulation element holding member 5R.

Such a connection structure by the liquid circulation members 9 forms a ring-shaped flow path C which starts from the red light modulation element holding member 5R, sequentially passes through the green light modulation element holding member 5G, the blue light modulation element holding member 5B, the liquid pumping unit 6, the tank 7, and the heat exchange section 81, and then returns to the red light modulation element holding member 5R.

The liquid crystal panel 341 is cooled down by the above-described liquid-cooling device 4. The cooling operation will be described as follows.

That is, heat generated by the liquid crystal panel 341 is transferred to cooling liquid through the optical element holding member 5.

The cooling liquid flowing out of the optical element holding member 5 flows into the heat exchange section 81 along the flow path C.

At this time, as the Peltier element 83 is driven, the heat suction surface 831 sucks the heat to cool down the heat exchange section 81. Therefore, when the cooling liquid flowing into the heat exchange section 81 passes through the internal minute flow paths Cm, heat exchange is performed between the spaces of the heat exchange section 81 such that the cooling liquid is cooled down.

The cooling liquid cooled down by the heat exchange section 81 flows into the optical element holding member 5 once again.

In the above-described embodiment of the invention, the following effect is obtained.

The liquid-cooling device 4 includes the tank 7 which temporarily stores cooling liquid therein, in addition to the optical element holding member 5 and the liquid pumping unit 6. Furthermore, the liquid pumping unit 6, the tank 7, and the optical element holding member 5 are arranged along the circulation direction of the cooling liquid in order of the liquid pumping unit 6, the tank 7, and the optical element holding member 5. Accordingly, the cooling liquid which is pumped from the liquid pumping unit 6 to pulsate is temporarily stored in the tank 7. That is, as the tank 7 functions as a buffer to absorb the pulsation of the cooling liquid in the tank 7, the cooling liquid which does not pulsate may flow into the optical element holding member 5.

Therefore, since the pulsation of the cooling liquid does not spread to the optical element holding member 5 and the liquid crystal panel 341, it is possible to stably secure the image quality of a projected image.

Furthermore, since the liquid pumping unit 6 and the tank 7 are directly connected together through the fourth liquid circulation member 9D, the pulsation of the cooling liquid generated by the liquid pumping unit 6 may be prevented at an early stage. That is, even when the heat exchange unit 8 is adopted in the liquid-cooling device 4 in addition to the optical element holding member 5, the liquid pumping unit 6, and the tank 7, it is possible to prevent the pulsation of the cooling liquid from spreading into the heat exchange unit 8 as well as the optical element holding member 5 and the liquid crystal panel 341. Therefore, it is possible to maintain favorably the function of the heat exchange unit 8.

Since the liquid-cooling device 4 includes the heat exchange unit 8, the Peltier element 83 is driven to cool down the heat exchange section 81. Furthermore, it is possible to cool down the cooling liquid flowing into and from the heat exchange section 81. Therefore, since the cooling liquid with a low temperature is circulated through the optical element holding member 5, it is possible to cool down effectively the liquid crystal panel 341.

The heat exchange section 81 is constructed as a heat exchanger such as a so-called micro channel, which has a plurality of minute flow paths Cm formed therein. That is, since it is possible to improve the heat exchange efficiency between the cooling liquid and the heat exchange section 81, it is possible to cool down effectively the cooling liquid flowing into and from the heat exchange section 81.

The tank 7, the heat exchange section 81, and the optical element holding member 5 are arranged along the circulation direction of the cooling liquid in order of the tank 7, the heat exchange section 81, and the optical element holding member 5. Accordingly, the cooling liquid which is heated when circulating through the optical element holding member 5 is temporarily stored in the tank 7, and then cooled down by the heat exchange unit 8 (the Peltier element 83). That is, since the cooling liquid is temporarily stored in the tank 7, the heat of the cooling liquid is diffused inside the tank 7. Therefore, it is possible to reduce the temperature of the cooling liquid. Furthermore, as the cooling liquid of which the temperature is reduced by the tank 7 is cooled down by the heat exchange unit 8 (the Peltier element 83), it is possible to reduce effectively the temperature of the cooling liquid to the atmosphere temperature or less, for example. Therefore, as the cooling liquid of which the temperature is effectively reduced is circulated through the optical element holding member 5, it is possible to cool down the liquid crystal panel 341 more effectively.

Since the tank 7 is formed of a metallic material, it is possible to dissipate the heat diffused inside the tank 7 to the outside of the tank 7 effectively. That is, as the cooling liquid is temporarily stored in the tank 7, the temperature of the cooling liquid is further reduced.

The heat exchange section 81 and the optical element holding member 5 are directly connected together through the sixth liquid circulation member 9F. Therefore, the cooling liquid of which the temperature is effectively reduced by the heat exchange unit 8 may directly flow into the optical element holding member 5. That is, since the cooling liquid flows into the optical element holding member 5 in a state that the temperature thereof is reduced by the heat exchange unit 8, it is possible to cool down the liquid crystal panel 341 more effectively.

The optical element holding member 5 and the liquid pumping unit 6 are directly connected together through the third liquid circulation member 9C. Therefore, when seen along the circulation direction of the cooling liquid, the optical element holding member 5 is disposed at the most distant position from the liquid pumping unit 6. Accordingly, since the cooling liquid does not flow into the optical element holding member 5 in a state in which the temperature thereof is increased in the liquid pumping unit 6 by the heat generated by the liquid pumping unit 6, the cooling efficiency of the liquid crystal panel 341 does not decrease.

As described above, the cooling liquid heated by the liquid pumping unit 6 is temporarily stored in the tank 7 such that the temperature thereof decreases. Therefore, the cooling liquid does not flow into the heat exchange section 81 in a state in which the temperature thereof is high.

The invention is not limited to the above-described embodiment, but modifications and variations can be made without departing from the spirit and scope of the invention.

In the above-described embodiment, the liquid crystal panel 341 is adopted as an optical element which is the target to be cooled down. Without being limited thereto, however, other optical elements including the light source devices 31A and 31B, the polarization conversion element 323, the incident-side polarization plate 342, and the emission-side polarization plate 343 may be targets to be cooled down.

In the above-described embodiment, the respective optical element holding members 5 are connected in series along the circulation direction of the cooling liquid in order of the red light modulation element holding member 5R, the green light modulation element holding member 5G, and the blue light modulation element holding member 5B through the first to third liquid circulation members 9A to 9C. The connection order is not limited thereto, but the respective units may be connected in a different connection order.

In the above-described embodiment, the respective optical element holding members 5 are connected in series. Without being limited thereto, however, the respective optical element holding members 5 may be connected in parallel. That is, the red light modulation element holding member 5R and the blue light modulation element holding member 5B may be connected in series along the circulation direction of the cooling liquid, and the green light modulation element holding member 5G may be connected in parallel to the red light modulation element holding member 5R and the blue light modulation element holding member 5B.

In the above-described embodiment, the three liquid crystal panels 341 are provided. However, the number of crystal panels is not limited thereto, but may be set to one, two, or four or more.

In the above-described embodiment, light modulation elements other than liquid crystals, such as devices using micro mirrors, may be adopted as the light modulation elements, in addition to the transmission-type or reflection-type liquid crystal panels.

In the above-described embodiment, the front-type projector which performs projection from a direction in which a screen is observed is taken as an example. However, the invention may be applied to a rear-type projector which performs projection from the opposite side of the direction in which the screen is observed.

The projector according to the embodiment of the invention stably secures the image quality of a projected image, while more effectively cooling down the optical elements by using cooling liquid. Therefore, the projector may be utilized as a projector which is used for presentation or as a home theater.

The present application claim priority from Japanese Patent Application No. 2009-074216 filed on Mar. 25, 2009, which is hereby incorporated by reference in its entirety.

What is claimed is:

1. A liquid-cooling device configured to cool down an optical element in a projector using cooling liquid, comprising:

an optical element holding member that is constructed to allow cooling liquid to flow in and out and holds the optical element so as to transfer heat to the cooling liquid;

a liquid pumping unit configured to circulate cooling liquid;

a liquid storage unit that is constructed to allow cooling liquid to flow in and out and temporarily stores cooling liquid therein;

a heat exchange section that is constructed to allow cooling liquid to flow in and out and exchanges heat with the cooling liquid;

a plurality of liquid circulation members configured to connect the optical element holding member, the liquid pumping unit, the liquid storage unit, and the heat exchange section and define a flow channel of the cooling liquid, wherein the liquid pumping unit, the liquid storage unit, the heat exchange section, and the optical element holding member are arranged along a circulation direction of the cooling liquid along the flow channel such that the cooling liquid flows in order through the liquid pumping unit, then through the liquid storage unit, then through the heat exchange section, and subsequently through the optical element holding member.

2. The liquid-cooling device according to claim 1, wherein the liquid pumping unit and the liquid storage unit are directly connected together through the liquid circulation member.

3. The liquid-cooling device according to claim 1, wherein the liquid-cooling device further includes:
a thermoelectric conversion element that has a heat suction surface and a heat dissipation surface, the heat suction surface being connected to the heat exchange section so as to transfer heat.

4. The liquid-cooling device according to claim 3, wherein the heat exchange section and the optical element holding member are directly connected together through the liquid circulation member.

5. The liquid-cooling device according to claim 3, further comprising:
a heat-dissipation-side heat transmission member that is connected to the heat dissipation surface included in the thermoelectric conversion element to transfer heat; and
a compartment plate that is disposed to compartmentalize the heat exchange section and the heat-dissipation-side heat transmission member and has an opening portion into which the thermoelectric conversion element is fitted, and is formed of a material having a low thermal conductivity.

6. The liquid-cooling device according to claim 5, wherein thermal conductivity of the material that forms the compartment plate is equal to or less than 0.9 W/(m·K).

7. The liquid-cooling device according to claim 1, wherein the optical element holding member and the liquid pumping unit are directly connected together through the liquid circulation member.

8. A projector comprising the liquid-cooling device according to claim 1.

9. The projector according to claim 8, wherein the liquid pumping unit and the liquid storage unit are directly connected together through the liquid circulation member.

10. The projector according to claim 8, wherein the liquid-cooling device further includes:
a thermoelectric conversion element that has a heat suction surface and a heat dissipation surface, the heat suction surface being connected to the heat exchange section so as to transfer heat.

11. The projector according to claim 10, wherein the heat exchange section and the optical element holding member are directly connected together through the liquid circulation member.

12. The projector according to claim 8, wherein the optical element holding member and the liquid pumping unit are directly connected together through the liquid circulation member.

13. The liquid-cooling device according to claim 1, wherein the optical element holding member includes a cooling liquid circulation pipe that substantially surrounds an outer periphery of an image formation region of the optical element in plan view.

* * * * *